(12) United States Patent
Oyobe et al.

(10) Patent No.: US 8,169,340 B2
(45) Date of Patent: May 1, 2012

(54) PARKING ASSIST DEVICE AND A METHOD FOR ELECTRIC VEHICLE POWER TRANSMISSION AND RECEPTION BETWEEN A VEHICLE AND A GROUND APPARATUS

(75) Inventors: Hichirosai Oyobe, Toyota (JP); Makoto Nakamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 596 days.

(21) Appl. No.: 11/992,386

(22) PCT Filed: Aug. 31, 2006

(86) PCT No.: PCT/JP2006/317710
§ 371 (c)(1),
(2), (4) Date: Mar. 21, 2008

(87) PCT Pub. No.: WO2007/037104
PCT Pub. Date: Apr. 5, 2007

(65) Prior Publication Data
US 2009/0040068 A1    Feb. 12, 2009

(30) Foreign Application Priority Data

Sep. 29, 2005 (JP) ................................ 2005-285147

(51) Int. Cl.
*B60Q 1/48* (2006.01)
(52) U.S. Cl. ..................... 340/932.2; 340/933; 340/934; 340/935; 340/936; 340/937; 701/22; 701/23; 320/106; 320/107; 320/108; 320/109; 320/110; 348/148; 348/149

(58) Field of Classification Search ....... 340/932.2–943; 701/22–23; 320/106–115; 348/148–149
See application file for complete search history.

(56) References Cited

U.S. PATENT DOCUMENTS

| 5,821,731 | A | * | 10/1998 | Kuki et al. ................... 320/108 |
| 6,014,597 | A |   | 1/2000 | Kochanneck |
| 6,087,806 | A | * | 7/2000 | Fujioka .......................... 320/109 |
| 2002/0149673 | A1 | * | 10/2002 | Hirama et al. ................. 348/118 |
| 2003/0122687 | A1 |   | 7/2003 | Trajkovic et al. |
| 2004/0267420 | A1 |   | 12/2004 | Tanaka et al. |
| 2005/0264432 | A1 | * | 12/2005 | Tanaka et al. .............. 340/932.2 |

(Continued)

FOREIGN PATENT DOCUMENTS

JP    A-03-014766    1/1991

(Continued)

*Primary Examiner* — George Bugg
*Assistant Examiner* — Ojiako Nwugo
(74) *Attorney, Agent, or Firm* — Oliff & Berridge, PLC

(57) ABSTRACT

A parking assist device has a touch display (58) including a display unit for displaying a situation around a vehicle and an input unit for entering a target parking position of a vehicle, and also has a control device (60) performing parking assist control by calculating a path according to the target parking position. The control device (60) further performs, under a predetermined condition, assist control for position alignment of a vehicle-side power transmission/reception unit placed on the vehicle with an apparatus-side power transmission/reception unit of an apparatus placed on a ground. Preferably, the parking assist device further has a back monitor camera (53) for taking an image of a surrounding situation of the vehicle. When an identifier indicating the apparatus-side power transmission/reception unit is present in the vicinity of the target parking position in the taken surrounding situation, the control device (60) recognizes the position of the identifier and performs the position alignment assist control.

26 Claims, 10 Drawing Sheets

U.S. PATENT DOCUMENTS

2006/0147264 A1 * 7/2006 Doran, Jr. .................. 404/73

FOREIGN PATENT DOCUMENTS

| | | |
|---|---|---|
| JP | A-03-284103 | 12/1991 |
| JP | A-08-154307 | 6/1996 |
| JP | A-08-265992 | 10/1996 |
| JP | A-09-213378 | 8/1997 |
| JP | A-10-117407 | 5/1998 |
| JP | A-10-124719 | 5/1998 |
| JP | A-2000-92622 | 3/2000 |
| JP | A-2001-006093 | 1/2001 |
| JP | A-2003-182489 | 7/2003 |
| JP | A-2004-291865 | 10/2004 |
| JP | A-2005-067263 | 3/2005 |
| JP | A-2005-080324 | 3/2005 |
| JP | A-2005-512893 | 5/2005 |

* cited by examiner

FIG.6

| CONTROL IN CHARGE OPERATION | BOOSTER CONVERTER | | 1ST INVERTER | | 2ND INVERTER | |
|---|---|---|---|---|---|---|
| | Q1 | Q2 | Q11 | Q12 | Q21 | Q22 |
| VAC>0:(VM1>VM2) | ON | OFF | OFF OR SWITCHING | SWITCHING | OFF | ON |
| VAC<0:(VM1<VM2) | ON | OFF | OFF | ON | OFF OR SWITCHING | SWITCHING |

PARKING ASSIST DEVICE AND A METHOD FOR ELECTRIC VEHICLE POWER TRANSMISSION AND RECEPTION BETWEEN A VEHICLE AND A GROUND APPARATUS

TECHNICAL FIELD

The invention relates to a method for electric power transmission and reception between a vehicle and a ground apparatus.

BACKGROUND ART

In recent years, hybrid vehicles have received great attention as environmentally friendly vehicles. The hybrid vehicle employs, as drive sources, a conventional engine as well as a battery, an inverter and an electric motor driven by the inverter.

Japanese Patent Laying-Open No. 8-154307 has disclosed a hybrid vehicle provided with an external charging function. The hybrid vehicle includes a battery that can be charged by an external charger, an electric motor driving wheels by an electric power supplied from the battery, control means for controlling an operation of the motor, an internal combustion engine directly and indirectly used for driving the wheels and traveling time related quantity calculating means that calculates a quantity related to a traveling time elapsed after the external charger charged the battery. The control means restricts the output of the electric motor when the traveling time related quantity calculated by the traveling time related quantity calculating means reaches a predetermined quantity.

When this hybrid vehicle has run for a long time without external charging, the output of the motor is restricted, and a driver is urged to perform the external charging. Therefore, this hybrid vehicle can reduce dependence on the internal combustion engine.

However, it is troublesome for a driver to connect the external charger to the vehicle via a charge cable every time the driver returns home and parks the vehicle at a parking space. Also, the driver must be careful to park the vehicle at an appropriate position when the driver moves the vehicle to a position near a fixed charger on a ground.

DISCLOSURE OF THE INVENTION

An object of the invention is to provide a parking assist device allowing simple charging as well as a method for electric power transmission and reception between a vehicle and a ground apparatus.

In summary, the invention provides a parking assist device including a display unit displaying a surrounding situation of a vehicle, an input unit for entering a target parking position of the vehicle, and a control unit performing parking assist control by calculating a path according to the target parking position. The control unit further performs, under a predetermined condition, position alignment assist control for aligning a vehicle-side power transmission/reception unit placed on the vehicle to an apparatus-side power transmission/reception unit of an apparatus placed on a ground.

Preferably, the parking assist device further includes an image-taking unit taking an image of the surrounding situation of the vehicle. The control unit performs the position alignment assist control by recognizing a position of an identifier indicating the apparatus-side power transmission/reception unit when the identifier is present near the target parking position in the surrounding situation taken by the image-taking unit.

Preferably, the apparatus supplies an electric power to the vehicle, and the vehicle is provided with a battery being externally chargeable through the vehicle-side power transmission/reception unit. The control unit determines according to a state of charge of the battery whether the charging is to be executed or not.

Preferably, the apparatus placed on the ground includes determining means for determining whether the vehicle is of a type capable of power transmission/reception or not.

Further preferably, the apparatus supplies the electric power to the vehicle, and the control unit instructs the connection of the vehicle-side power transmission/reception unit to the apparatus-side power transmission/reception unit after the end of the parking assist control when the vehicle is of the chargeable type.

Preferably, the apparatus includes an arm being extendable according to an instruction of the control unit for connecting the apparatus-side power transmission/reception unit to the vehicle-side power transmission/reception unit.

Preferably, the vehicle includes an arm being extendable according to an instruction of the control unit for connecting the vehicle-side power transmission/reception unit to the apparatus-side power transmission/reception unit.

Preferably, the control unit performs, as the parking assist control, automatic steering according to movement of the vehicle on the path.

According to another aspect of the invention, a method for electric power transmission and reception between a vehicle and a ground apparatus includes the steps of instructing start of movement of the vehicle; moving the vehicle to a parking position; determining whether the vehicle can transmit and receive an electric power or not; and transmitting and receiving the electric power, between the vehicle and the apparatus placed on a ground after the vehicle is parked at a parking position when it is determined in the determining step that the vehicle can transmit and receive the electric power.

Preferably, the method for the electric power transmission and reception between the vehicle and the ground apparatus further includes the steps of instructing start of execution of the parking assist; setting the parking position; and correcting the parking position set in the setting step according to relative positions of the vehicle and the apparatus.

Further preferably, the method for the electric power transmission and reception between the vehicle and the ground apparatus further includes the step of inquiring of the driver, for confirmation, about whether the parking of the vehicle is to be executed or not based on the parking position corrected in the correcting step.

According to the invention, the driver can simply performs the charging, and feels less troublesome when performing the charging. These contribute to spread of vehicles requiring the charging.

BRIEF DESCRIPTION OF THE DRAWINGS

FIG. 6 shows a control state of transistors in a charging operation.

BEST MODES FOR CARRYING OUT THE INVENTION

Embodiments of the invention will now be described with reference to the drawings. In the following description and drawings, the corresponding portions bear the same reference numbers, and description thereof is not repeated.

First Embodiment

Figure 1:
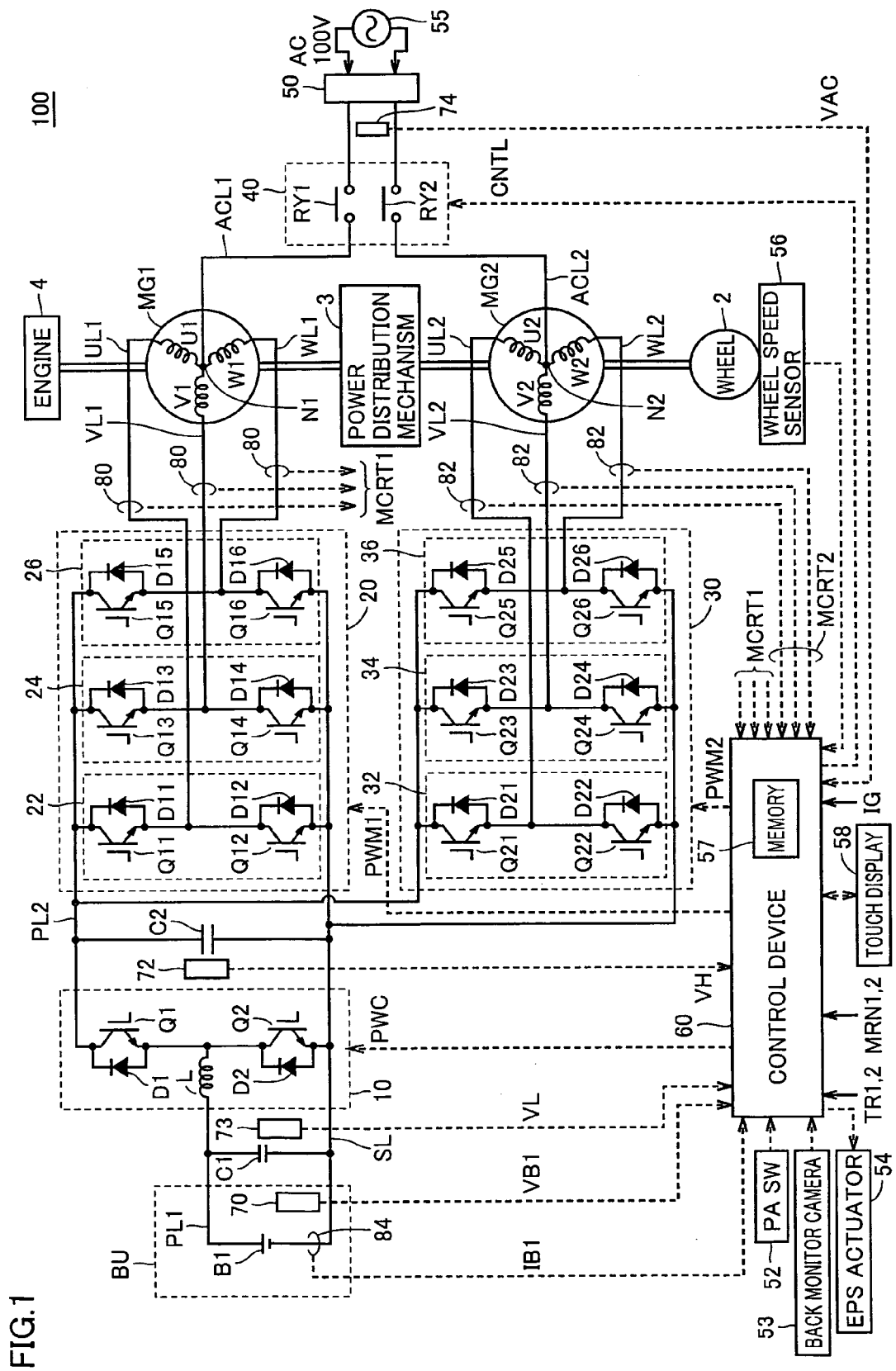
FIG. 1 is a schematic block diagram of a vehicle 100 according to a first embodiment of the invention.

FIG. 1 is a schematic block diagram of a vehicle 100 according to the invention.

Referring to FIG. 1, vehicle 100 includes a battery unit BU, a booster converter 10, inverters 20 and 30, power supply lines PL1 and PL2, a ground line SL, U-phase lines UL1 and UL2, V-phase lines VL1 and VL2, W-phase lines WL1 and WL2, motor generators MG1 and MG2, an engine 4, a power distribution mechanism 3 and wheels 2.

Vehicle 100 is a hybrid vehicle employing the motor and the engine for driving the wheels.

Power distribution mechanism 3 is coupled to engine 4 and motor generators MG1 and MG2 for distributing a power among them. For example, a planetary gear mechanism having three rotation axes of a sun gear, a planetary carrier and a ring gear can be used as the power distribution mechanism. These three rotation axes are connected to engine 4 and motor generators MG1 and MG2, respectively. For example, motor generator MG1 may have a hollow rotor, and a crank shaft of engine 4 may extend through the center of the rotor. Thereby, power distribution mechanism 3 can be mechanically connected to engine 4 and motor generators MG1 and MG2.

The rotation axis of motor generator MG2 is coupled to wheels 2 via a reduction gear and a differential gear which are not shown in the figures. Another reduction gear for the rotation axis of motor generator MG2 may be incorporated into power distribution mechanism 3.

Motor generator MG1 is incorporated into the hybrid vehicle for operating as an electric power generator driven by the engine and for operating as an electric motor that can start the engine. Motor generator MG2 is incorporated into the hybrid vehicle for operating as an electric motor that drives the wheels of the hybrid vehicle.

Motor generators MG1 and MG2 are, e.g., three-phase AC synchronous motors, respectively. Motor generator MG1 includes three-phase coils, i.e., U-, V- and W-phase coils U1, V1 and W1 as stator coils. Motor generator MG2 includes three-phase coils, i.e., U-, V- and W-phase coils U2, V2 and W2 as stator coils.

Motor generator MG1 generates a three-phase AC voltage, using an engine output, and supplies the generated three-phase AC voltage to inverter 20. Motor generator MG1 generates a drive power from the three-phase AC voltage received from inverter 20, and thereby starts the engine.

Motor generator MG2 generates a drive torque for the vehicle from the three-phase AC voltage received from inverter 30. Motor generator MG2 generates a three-phase AC voltage and provides it to inverter 30 during a regenerative braking operation of the vehicle.

Battery unit BU includes a battery B1 having a negative pole connected to ground line SL, a voltage sensor 70 measuring a voltage of battery B1 and a current sensor 84 measuring a current of battery B1. A vehicle load includes motor generators MG1 and MG2, inverters 20 and 30, and booster converter 10 supping a boosted voltage to inverters 20 and 30.

Battery B1 may be a secondary battery such as a nickel hydrogen battery, a lithium ion battery or a lead acid battery. Alternatively, battery B1 may be replaced with an electric double layer capacitor of a large capacitance.

Battery unit BU provides a DC voltage supplied from battery B1 to booster converter 10. Battery B1 inside battery unit BU is charged with the DC voltage provided from booster converter Q1.

Booster converter 10 includes a reactor L, npn transistors Q1 and Q2, and diodes D1 and D2. Reactor L has an end connected to power supply line PL1, and the other end thereof is connected to a node between npn transistors Q1 and Q2. npn transistors Q1 and Q2 are connected in series between power supply line PL2 and ground line SL, and receives on their bases a signal PWC from a control device 60. Diodes D1 and D2 are provided for transistors Q1 and Q2, respectively, and each are connected between an emitter and a collector of the corresponding transistor for passing a current from the emitter to the collector.

IGBTs (Insulated Gate Bipolar Transistors) may be used as the npn transistors described above as well as npn transistors in the following description, respectively. Also, instead of the npn transistors, power switching elements such as power MOSFETs (Metal Oxide Semiconductor Field-Effect Transistors) may be used.

Inverter 20 includes U-, V- and W-phase arms 22, 24 and 26, which are connected in parallel between power supply line PL2 and ground line SL.

U-phase arm 22 includes npn transistors Q11 and Q12 connected in series. V-phase arm 24 includes npn transistors Q13 and Q14 connected in series. W-phase arm 26 includes npn transistors Q15 and 16 connected in series. Diodes D11-D16 are arranged for npn transistors Q11-Q16, respectively, and each are connected between the collector and the emitter of the corresponding transistor for passing the current from the emitter to the collector. A node between the npn transistors in each phase arm is connected via corresponding U-, V- or W-phase line UL1, VL1 or WL1 to a coil end of the corresponding phase coil of motor generator MG1 other than its neutral point N1.

Inverter 30 includes U-, V- and W-phase arms 32, 34 and 36, which are connected in parallel between power supply line PL2 and ground line SL.

U-phase arm 32 includes npn transistors Q21 and Q22 connected in series. V-phase arm 34 includes npn transistors Q23 and Q24 connected in series. W-phase arm 36 includes npn transistors Q25 and Q26 connected in series. Diodes D21-D26 are arranged for npn transistors Q21-Q26, respectively, and each are connected between the collector and the emitter of the corresponding npn transistor for passing the current from the emitter to the collector. In inverter 30, each node between the npn transistors of each phase arm is connected via corresponding U-, V- or W-phase line UL2, VL2 or WL2 to a coil end of the corresponding phase coil of motor generator MG2 other than a neutral point N2.

Vehicle 100 further includes capacitors C1 and C2, a relay circuit 40, a connector 50, control device 60, AC lines ACL1 and ACL2, voltage sensors 72-74 and current sensors 80 and 82.

Capacitor C1 is connected between power supply line PL1 and ground line SL, and reduces an influence on battery B1 and booster converter 10 due to voltage variations. A voltage sensor 73 measures a voltage VL between power supply line PL1 and ground line SL.

Capacitor C2 is connected between power supply line PL2 and ground line SL, and reduces an influence on booster converter 10 and inverters 20 and 30 due to variations in voltage. A voltage sensor 72 measures a voltage VH between power supply line PL2 and ground line SL.

Booster converter 10 boosts a DC voltage supplied from battery unit BU via power supply line PL1, and provides it to power supply line PL2. More specifically, booster converter 10 accumulates, as a magnetic field energy, a current flowing according to a switching operation of npn transistor Q2 in reactor L based on a signal PWC provided from control device 60, and discharges the accumulated energy by passing a current to power supply line PL2 via diode D1 in synchronization with the turn-off of npn transistor Q2. Thereby, booster converter 10 performs the boosting operation.

Based on signal PWC provided from control device 60, booster converter 10 charges the battery inside battery unit BU by stepping down the DC voltage supplied from one or both of inverters 20 and 30 via power supply line PL2 to a voltage level of battery unit BU.

Based on a signal PWM1 provided from control device 60, inverter 20 converts the DC voltage supplied from power supply line PL2 into a three-phase AC voltage to drive motor generator MG1.

Thereby, motor generator MG1 is driven to generate a torque designated by a torque instruction value TR1. Inverter 20 converts the three-phase AC voltage that is generated by motor generator MG1 receiving the output of the engine into a DC voltage based on signal PWM1 received from control device 60, and provides the produced DC voltage to power supply line PL2.

Based on a signal PWM2 provided from control device 60, inverter 30 drives converts the DC voltage supplied from power supply line PL2 into a three-phase AC voltage to drive motor generator MG2.

Thereby, motor generator MG2 is driven to generate a torque designated by a torque instruction value TR2. During the regenerative braking operation of the hybrid vehicle provided with vehicle 100, inverter 30 converts the three-phase AC voltage generated by motor generator MG2 receiving the rotative force from the drive shaft into a DC voltage based on signal PWM2 provided from control device 60, and provides the produced DC voltage to power supply line PL2.

The regenerative braking in this description includes braking that is performed when a driver of the hybrid vehicle steps on a foot brake, and is accompanied by regenerative power generation, and also includes deceleration (or stopping of acceleration) of the vehicle that is performed by releasing an accelerator pedal during running without operating the foot brake while performing the regenerative power generation.

Relay circuit 40 includes relays RY1 and RY2, which may be mechanical contact relays and may also be semiconductor relays, respectively. Relay RY1 is arranged between AC line ACL1 and connector 50, and is turned of/off in response to control signal CNTL from control device 60. Relay RY2 is arranged between AC line ACL2 and connector 50, and is turned on/off in response to control signal CNTL from control device 60.

Relay circuit 40 connects or disconnects AC lines ACL1 and ACL2 to or from connector 50 in response to control signal CNTL provided from control device 60. More specifically, when relay circuit 40 receives control signal CNTL at an H-level (logical high level) from control device 60, it electrically connects AC lines ACL1 and ACL2 to connector 50. When relay circuit 40 receives control signal CNTL at an L-level (logical low level) from control device 60, it electrically disconnects AC lines ACL1 and ACL2 from connector 50.

Connector 50 is a terminal for applying an AC voltage of an external power supply 55 between neutral points N1 and N2 of motor generators MG1 and MG2. Thus AC voltage may be an AC 100 V supplied from the domestic commercial power line. Voltage sensor 74 measures the voltage supplied to connector 50, and transmits a measured value to control device 60.

Voltage sensor 70 senses a battery voltage VB1 of battery B1, and provides sensed battery voltage VB1 to control device 60. Voltage sensor 73 senses the voltage between the opposite ends of capacitor C1, i.e., input voltage VL of booster converter 10, and provides sensed voltage VL to control device 60. Voltage sensor 72 senses the voltage between the opposite ends of capacitor C2, i.e., output voltage VH (which corresponds to the input voltages of inverters 20 and 30 in this description) of booster converter 10, and provides sensed voltage VH to control device 60.

Current sensor 80 senses a motor current MCRT1 flowing through motor generator MG1, and provides sensed motor current MCRT1 to control device 60. Current sensor 82 senses a motor current MCRT2 flowing through motor generator MG2, and provides sensed motor current MCRT2 to control device 60.

Control device 60 produces signal PWC for driving booster converter 10 based on torque instruction values TR1 and TR2 and motor revolution speeds MRN1 and MRN2 of respective motor generators MG1 and MG2 provided from an external ECU (Electronic Control Unit) as well as voltages VL and VH provided from voltage sensors 72 and 73, respectively, and provides signal PWC thus produced to booster converter 10.

Control device 60 produces signal PWM1 for driving motor generator MG1 based on voltage VH as well as motor current MCRT1 and torque instruction value TR1 of motor generator MG1, and provides signal PWM1 thus produced to inverter 20. Further, control device 60 produces signal PWM2 for driving motor generator MG2 based on voltage VH as well as motor current MCRT2 and torque instruction value TR2 of motor generator MG2, and provides signal PWM2 thus produced to inverter 30.

Control device 60 produces signals PWM1 and PWM2 for controlling inverters 20 and 30 so that battery B1 may be charged with the AC voltage of the commercial power supply applied between neutral points N1 and N2 of motor generators MG1 and MG2, based on a signal IG from an ignition switch or key and an SOC (State Of Charge) of battery B1.

Control device 60 determines based on the SOC of battery B1 whether it can be externally charged or not. When it can be externally charged, control device 60 provides control signal CNTL at the H-level to relay circuit 40. When control device 60 determines that battery B 1 is substantially fully charged and cannot be charged, it provides control signal CNTL at the L-level to relay circuit 40. When signal IG indicates a stop state, control device 60 stops inverters 20 and 30.

Vehicle 100 further includes a parking assist switch 52 for entering setting of performing or not performing the parking assist by a parking assist device of the vehicle, a back monitor camera 53 taking an image of a surrounding situation behind the vehicle, a touch display 58 displaying the surrounding situation behind the vehicle and also functioning as in input device for designating a target parking position, a wheel speed sensor 56 sensing rotations of wheel 2 and an EPS actuator 54 driving a steering device, i.e., an electric power steering device. The target parking position designated by touch display 58 is stored in a memory 57 arranged in control device 60.

Back monitor camera 53 is arranged at the rear center of the vehicle, and takes an image of a region spreading at a predetermined angle behind the vehicle. Image information about the situation near and behind the vehicle obtained by back monitor camera 53 is supplied to control device 60.

Touch display 58 is arranged in a position (e.g., at a center of an instrument panel) where a vehicle's driver can view and operate. Control device 60 displays an actual image taken by back monitor camera 53 on touch display 58, e.g., when a gearshift is in a reverse position. Touch display 58 displays on its screen an image of the situation near and behind the vehicle taken by back monitor camera 53 according to an instruction of control device 60. Touch display 58 displays an auxiliary line, frame and the like for assisting and controlling the parking according to the instruction of control device 60 in such a fashion that these are superimposed on the actual image taken by back monitor camera 53.

Touch display 58 is provided with a pressure-sensitive or thermo-sensitive touch operation unit that can be operated by the vehicle driver. The touch operation unit is formed of a plurality of hierarchical switches, and is displayed on the screen according to the instruction from control device 60. Control device 60 senses a touch of the touch operation unit by the vehicle driver, and executes processing according to specific contents of the touch operation unit. The touch operation unit includes switches for performing the parking assist control, i.e., switches for starting a garage parking mode and a tandem parking mode, respectively, as well as arrow button switches for designating a target parking space frame position for parking the vehicle by the driver and the like.

In connection with EPS actuator 54 applying a torque to a steering shaft, the device includes a torque sensor sensing a steering torque applied to the steering shaft by the steering operation of the vehicle driver and a steering angle sensor sensing a steering angle of the steering shaft, although these sensors are not shown in the figures. Control device 60 controls the electric motor to generate a torque that assists the steering torque during the steering operation of the driver, and also controls EPS actuator 54 to generate a torque for steering the vehicle without requiring the steering operation of the driver when the vehicle parking operation such as the garage parking, the tandem parking of the like is performed under the parking assist control.

The steering angle sensor provides the steering angle information about the steering shaft to control device 60. Control device 60 calculates the target steering angle of the steering shaft to be attained when the parking assist control is executed, and controls EPS actuator 54 to generate a torque for the parking assist control according to the target steering angle.

Control device 60 internally has memory 57 for reading and writing data. Memory 57 stores position information about the position, on a road (on absolute coordinates), of the target parking space frame that is set by the position setting of the driver as will be described later, and also stores path information that relates to the path to the target parking position and is produced by the calculation. The information stored in memory 57 will be erased when the parking assist control is completed and, for example, when the shift position is changed from the reverse to the park, neutral or the like, or when the vehicle reaches a position close to the target parking position.

The parking assist device achieved by control device 60 includes touch display 58 including a display for displaying the surrounding situation of the vehicle as well as the input unit for inputting the target parking position of the vehicle, and also includes control device 60 calculating the path corresponding to the target parking position and performing the parking assist control. Control device 60 further performs, under a predetermined condition, the assist control for aligning the positions of a vehicle-side power supply/receive unit arranged in the vehicle and an apparatus-side power supply/receive unit of an apparatus on the ground. Preferably, the parking assist device further includes back monitor camera 53 taking the image of the surrounding situation of the vehicle. Control device 60 performs the position alignment assist control by recognizing a position of an identifier indicating the apparatus-side power supply/receive unit when the identifier is present near the target parking position in the taken surrounding situation.

Control device 60 may be achieved by a plurality of comparators such as am electric power steering comparator, a hybrid control computer and a parking assist computer.

Figure 2:
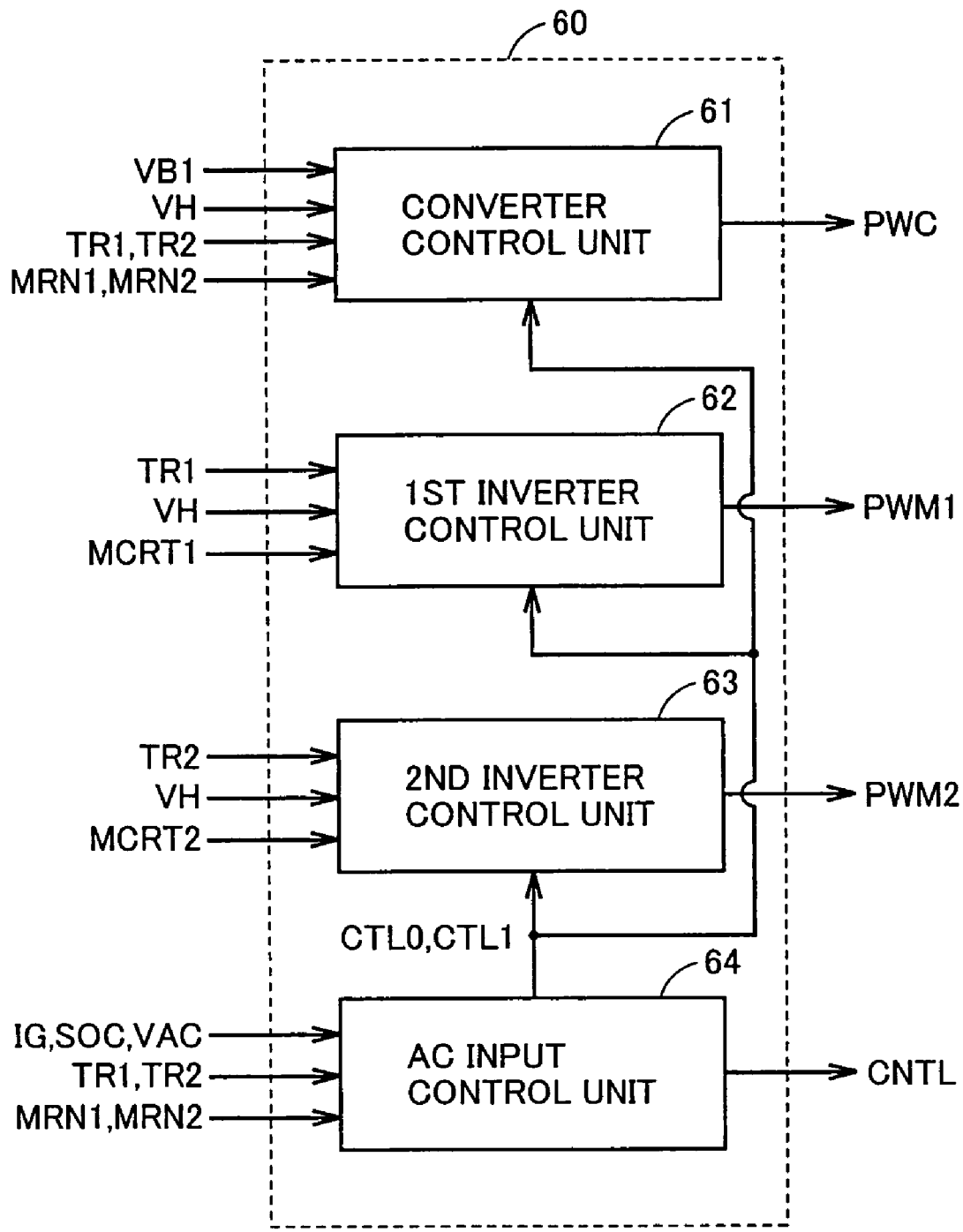
FIG. 2 is a functional block diagram of a control device 60 shown in FIG. 1.

FIG. 2 is a function block diagram relating to the motor generator control and the charge control of control device 60 shown in FIG. 1.

Referring to FIG. 2, control device 60 includes a converter control unit 61, first and second inverter control units 62 and 63, and an AC input control unit 64. Converter control unit 61 produces signal PWC for turning on/off npn transistors Q 1 and Q2 of booster converter 10 based on battery voltage VB 1, voltage VH, torque instruction values TR1 and TR2, and motor revolution speeds MRN1 and MRN2, and provides produced signal PWC to booster converter 10.

First inverter control unit 62 produces signal PWM1 for turning on/off npn transistors Q11-Q16 of inverter 20 based on torque instruction value TR1 and motor current MCRT1 of motor generator MG1 as well as voltage VH, and provides produced signal PWM1 to inverter 20.

Second inverter control unit 63 produces signal PWM2 for turning on/off npn transistors Q21-Q26 of inverter 30 based on torque instruction value TR2 and motor current MCRT2 of motor generator MG2 as well as voltage VH, and provides produced signal PWM2 to inverter 30.

AC input control unit 64 determines the drive states of motor generators MG1 and MG2 based on torque instruction values TR1 and TR2 as well as motor revolution speeds MRN1 and MRN2, and performs cooperative control on the two inverters based on signal IG and the SOC of batter B1. Thereby, AC input control unit 64 converts the externally supplied AC voltage into the DC, boosts it and charges the battery.

Signal IG at the H-level means that the hybrid vehicle with vehicle 100 is operating, and signal IG at the L-level means that the hybrid vehicle is in the stopped state.

In the case where motor generators MG1 and MG2 are in the stopped state and signal IG likewise indicates that the hybrid vehicle is in the stopped state, AC input control unit 64 performs the charging when the SOC of battery B1 is lower than the predetermined level. More specifically, AC input control unit 64 provides control signal CNTL to turn on relays RY1 and RY2, produces control signal CTL1 in response to any input of a voltage VAC for performing cooperative control of inverters 20 and 30 to convert the externally supplied AC voltage into the DC voltage and to boost it, and charges the battery.

AC input control unit 64 does not perform the charging operation when motor generators MG1 and MG2 are currently operating or signal IG indicates that the hybrid vehicle is being driven, or when the SOC of battery B1 is higher than a predetermined level. More specifically, AC input control unit 64 opens relays RY1 and RY2 by signal CNTL, and produces control signal CTL0 to cause booster converter 10 and inverters 20 and 30 to perform the ordinary operation for the vehicle driving.

Figure 3:
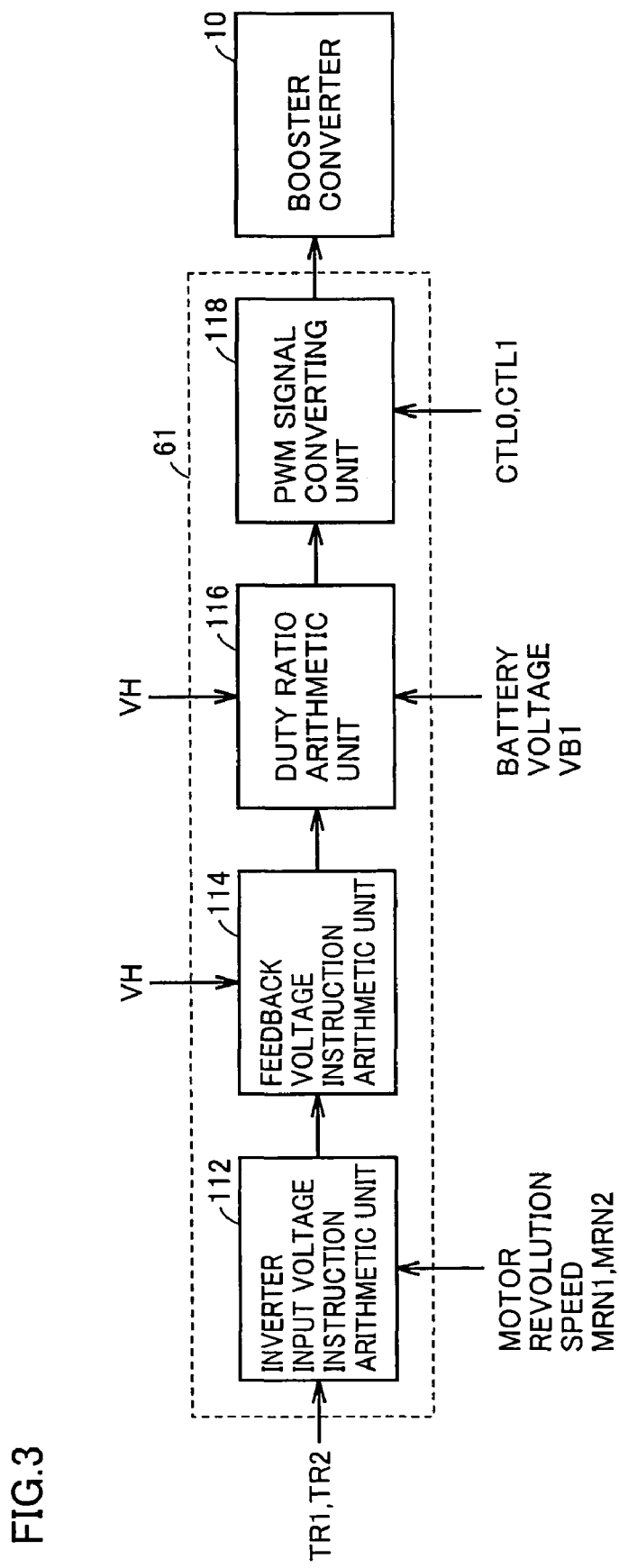
FIG. 3 is a functional block diagram of a converter control unit 61 shown in FIG. 2.

FIG. 3 is a function block diagram of converter control unit 61 shown in FIG. 2.

Referring to FIG. 3, converter control unit 61 includes an inverter input voltage instruction arithmetic unit 112, a feedback voltage instruction arithmetic unit 114, a duty ratio arithmetic unit 116 and a PWM signal converting unit 118.

Inverter input voltage instruction arithmetic unit 112 arithmetically obtains the optimum value (target value) of the inverter input value, i.e., a voltage instruction VH_com based on torque instruction values TR1 and TR2 as well as motor revolution speeds MRN1 and MRN2, and provides voltage instruction VH_com thus obtained to feedback voltage instruction arithmetic unit 114.

Based on output voltage VH of booster converter 10 sensed by voltage sensor 72 and voltage instruction VH_com provided from inverter input voltage instruction arithmetic unit 112, feedback voltage instruction arithmetic unit 114 arithmetically obtains a feedback voltage instruction VH_com_fb for controlling output voltage VH to attain voltage instruction VH_com, and provides feedback voltage instruction VH_com_fb thus obtained to duty ratio arithmetic unit 116.

Based on battery voltage VB1 provided from voltage sensor 70 and feedback voltage instruction VH_com_fb provided from feedback voltage instruction arithmetic unit 114, duty ratio arithmetic unit 116 arithmetically obtains a duty ratio for controlling output voltage VH of booster converter 10 to attain voltage instruction VH_com, and provides the obtained duty ratio to PWM signal converting unit 118.

PWM signal converting unit 118 produces a PWM (Pulse Width Modulation) signal for turning on/off npn transistors Q1 and Q2 of booster converter 10 based on the duty ratio received from duty ratio arithmetic unit 116, and provides the PWM signal thus produced, as signal PWC, to npn transistors Q1 and Q2 of booster converter 10.

By increasing the ON duty of npn transistor Q2 of the lower arm of booster converter 10, the power storage of reactor L increases so that the output of a higher voltage can be obtained. By increasing the ON duty of npn transistor Q1 of the upper arm, the voltage of power supply line PL2 lowers. Therefore, by controlling the duty ratios of npn transistors Q1 and Q2, it is possible to control the voltage on power supply line PL2 to attain an arbitrary voltage equal to or higher than the output voltage of battery B1.

Further, PWM signal converting unit 118 keeps npn transistors Q1 and Q2 in the on and off states regardless of duty ratio arithmetic unit 116, respectively, when control signal CTL1 is active. Thereby, it is possible to pass the charge current from power supply line PL2 to power supply line PL1.

Figure 4:
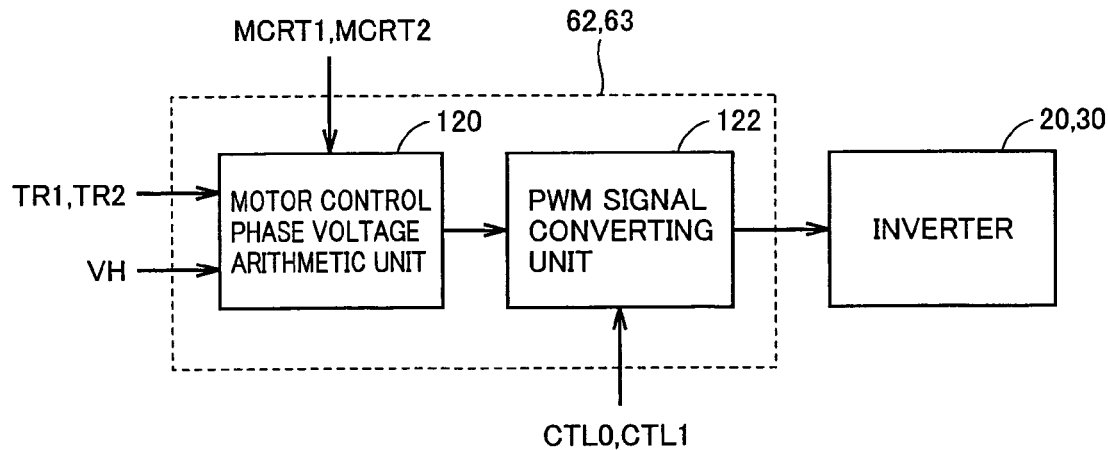
FIG. 4 is a functional block diagram of first and second inverter control units 62 and 63 shown in FIG. 2.

FIG. 4 is a function block diagram showing first and second inverter control units 62 and 63 shown in FIG. 2.

Referring to FIG. 4, each of first and second inverter control units 62 and 63 includes a motor control phase voltage (i.e., a phase voltage for motor control) arithmetic unit 120 and a PWM signal converting unit 122.

Motor control phase voltage arithmetic unit 120 receives input voltage VH of inverters 20 and 30 from voltage sensor 72, receives motor current MCRT1 (or MCRT2) flowing through each phase of motor generator MG1 (or MG2) from current sensor 80 (or 82), and receives torque instruction value TR1 (or TR2) from the ECU. Based on these input values, motor control phase voltage arithmetic unit 120 arithmetically obtains the voltage to be applied to each phase coil of motor generator MG1 (or MG2), and provides each phase coil voltage thus obtained to PWM signal converting unit 122.

When PWM signal converting unit 122 receives control signal CTL0 from AC input control unit 64, PWM signal converting unit 122 produces a signal PWM1_0 which is a kind of signal PWM1 (or a signal PWM2_0 which is a kind of signal PWM2) and actually turns on/off each of npn transistors Q11-Q16 (or Q21-Q26) of inverter 20 (or 30), based on each phase coil voltage instruction received from motor control phase voltage arithmetic unit 120, and provides signal PWM1_0 (or PWM2_0) thus produced to each of npn transistors Q11-Q16 (or Q21-Q26) of inverter 20 (or 30).

In this manner, the switching control of respective npn transistors Q11-Q16 (or Q21-Q26) is performed, and the currents passed through the respective phases of motor generator MG1 (or MG2) are controlled to output the instructed torque from motor generator MG1 (or MG2). Consequently, the motor torque corresponding to torque instruction value TR1 (or TR2) is output.

When PWM signal converting unit 122 receives control signal CTL1 from AC input control unit 64, PWM signal converting unit 122 produces a signal PWM1_1 which is a kind of signal PWM1 (or a signal PWM2_1 which is a kind of signal PWM2) and turns on/off npn transistors Q11-Q16 (or Q21-Q26) to pass the AC currents of the same phase through U-, V- and W-phase arms 22, 24 and 26 (or 30, 32 and 36) of inverter 20 (or 30) regardless of the output of motor control phase voltage arithmetic unit 120, and provides signal PWM1_1 (or PWM2_1) thus produced to npn transistors Q1'-Q16 (or Q21-Q26) of inverter 20 (or 30).

When the AC currents of the same phase flow through the U-, V- and W-phase coils, motor generators MG1 and MG2 does not generate a rotation torque. Inverters 20 and 30 undergo the cooperative control, and thereby convert AC voltage VAC into the DC charge voltage.

Then, description will be given on a method of generating the DC charge voltage in vehicle 100 from AC voltage VAC of the commercial power supply.

Figure 5:
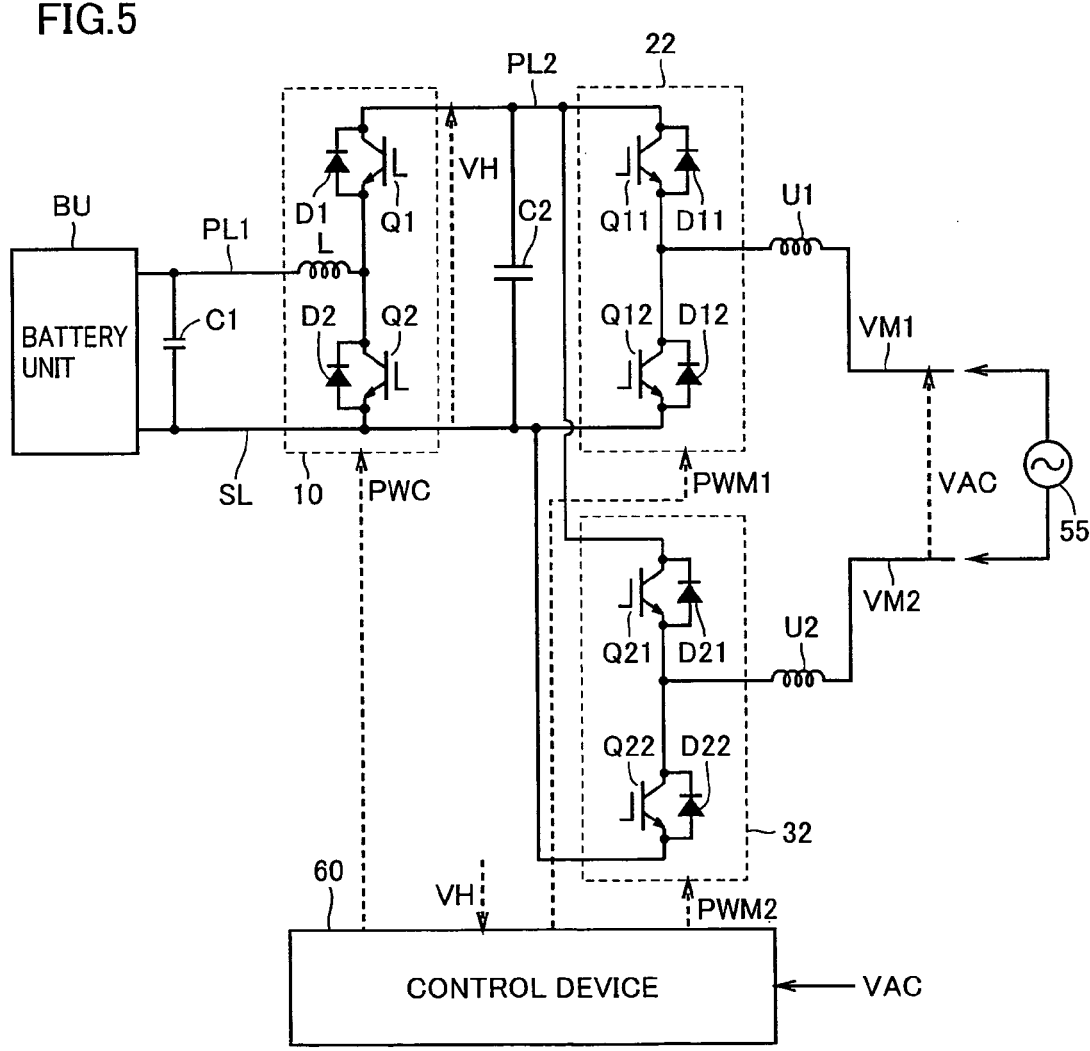
FIG. 5 shows, in a simplified form, portions relating to charging in the circuit diagram of FIG. 1.

FIG. 5 schematically shows a portion relating to the charge in the circuit diagram of FIG. 1.

FIG. 5 shows, as a representative example, the U-phase arm in inverters 20 and 30 shown in FIG. 1. Also, the U-phase coil is shown as a representative example among the three-phase coils of the motor generator. The operation relating to the U-phase will be described below. Other phase coils pass the currents of the same phase as the U-phase coil, and therefore the circuits thereof operate in the same manner as those of the U-phase coil. As can be seen from FIG. 5, each of a set of U-phase coil U1 and U-phase arm 22 and a set of U-phase coil U2 and U-phase arm 32 has substantially the same structure as booster converter 10. Therefore, it is possible to convert the AC voltage of 100 V into the DC voltage, and further it is possible to boost the voltage and to perform the conversion to provide the battery charge voltage, e.g., of about 200 V.

FIG. 6 shows control states of the transistors in the charging operation.

Referring to FIGS. 5 and 6, when voltage VAC is larger than 0, i.e., when voltage VM1 on line ACL1 is higher than voltage VM2 on line ACL2, transistor Q1 of the booster converter is on, and transistor Q2 is off. Thereby, booster converter 10 can pass the charge current from power supply line PL2 to power supply line PL1.

In the first inverter, switching of transistor Q12 is performed with a period and a duty ratio that correspond to voltage VAC, and transistor Q11 is controlled to attain the off state or to attain the switching state in which it is turned on in synchronization with the turn-on of diode D11. At the same time, transistors Q21 and Q22 in the second inverter are controlled to attain the off state and the on state, respectively.

When voltage VAC is larger than 0 and transistor Q12 is on, the current flows through coil U1, transistor Q12, diode D22 and coil U2 in this order. In this state, the energy accumulated in coils U1 and U2 is discharged when transistor Q12 is turned off, and the current flows through diode D11 to power supply line PL2. For reducing the loss by diode D11, transistor Q11 may be turned on in synchronization with the on period of diode D1. Based on the values of voltages VAC and VH, the period of switching and the duty ratio of transistor Q12 of which boosting ratio is obtained are determined.

When voltage VAC is lower than 0 and thus voltage VM1 on line ACL1 is lower than voltage VM2 on line ACL2, transistor Q1 of the booster converter is on, and transistor Q2 is off. Thereby, booster converter 10 can pass the charge current from power supply line PL2 to power supply line PL1.

In the second inverter, switching of transistor Q22 is performed with a period and a duty ratio that correspond to voltage VAC, and the transistor Q21 is controlled to attain the off state or to attain the switching state in which it is turned on in synchronization with the turn-on of diode D21. At this point in time, transistors Q11 and Q12 in the first inverter attain the off state and the on state, respectively.

When voltage VAC is lower than 0 and transistor Q22 is on, the current flows through coil U2, transistor Q22, diode D12 and coil U1 in this order. In this state, the energy accumulated in coils U1 and U2 is discharged when transistor Q22 is turned off, and this current flows through diode D21 to power supply line PL2. For reducing the loss by diode D21, transistor Q21 may be turned on in synchronization with the on period of diode D21. Based on the values of voltages VAC and VH, the period of switching and the duty ratio of transistor Q22 of which boosting ratio is obtained are determined.

Detailed description will now be given on the points relating to the parking of vehicle 100 at a predetermined position and the connection of power supply 55 to connector 50.

Figure 7:
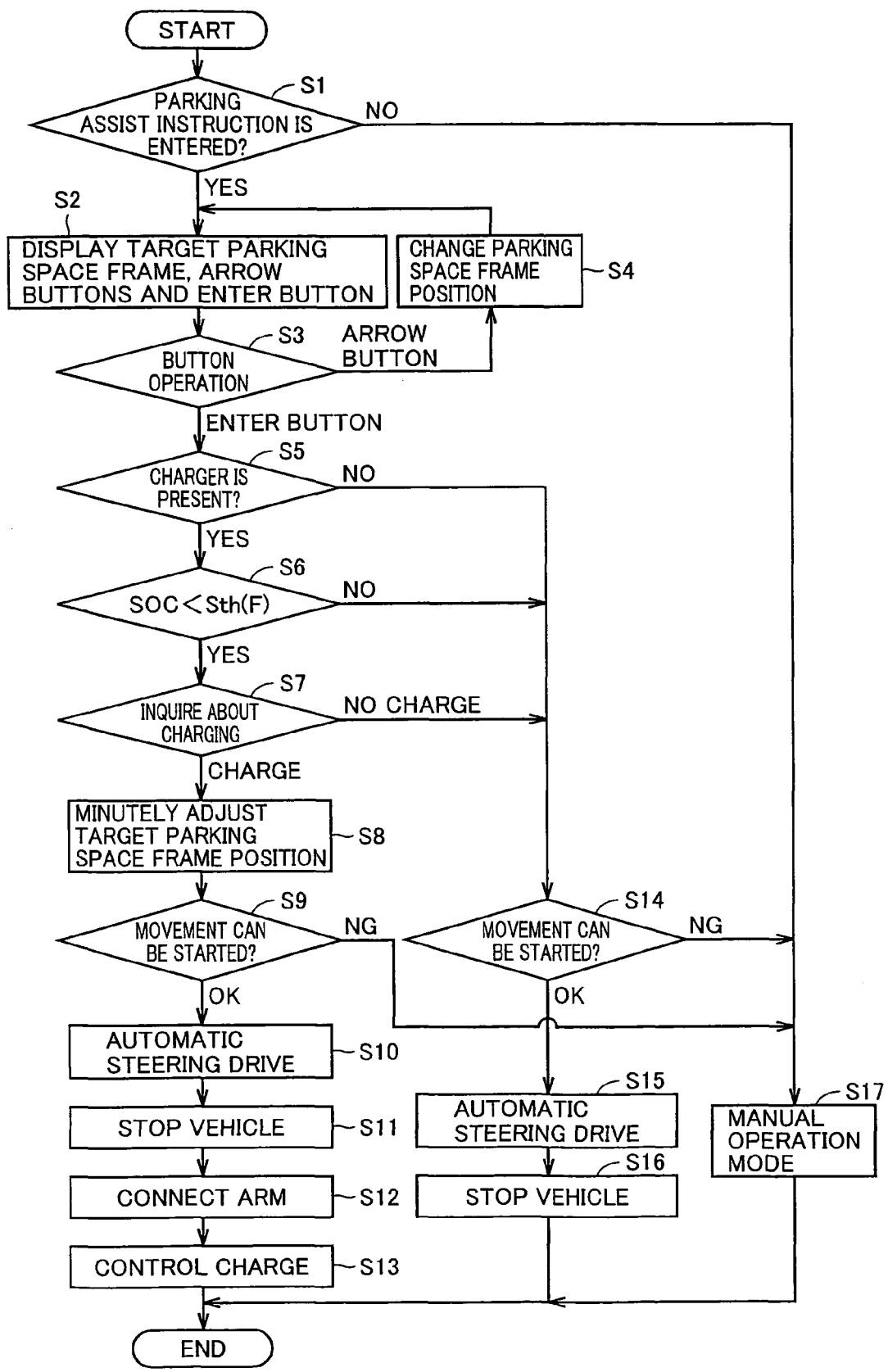
FIG. 7 is a flowchart showing a control structure of a parking assist control program executed by vehicle 100.

FIG. 7 shows a control structure of a parking assist control program executed by vehicle 100.

Referring to FIGS. 1 and 7, when the processing starts, it is determined in step S1 whether a parking assist instruction is entered or not. For example, when parking assist switch 52 is on and the shift lever is in the reverse position, it is determined that the parking assist instruction is entered.

When it is determined in step S1 that the parking assist instruction is not entered, the process proceeds to step S17, and the vehicle enters a manual operation mode in which automatic steering is not performed. When it is determined in step S1 that the parking assist instruction is entered, the process proceeds to step S2.

In step S2, touch display 58 displays the target parking space frame, arrow buttons and the enter button.

Figure 8:
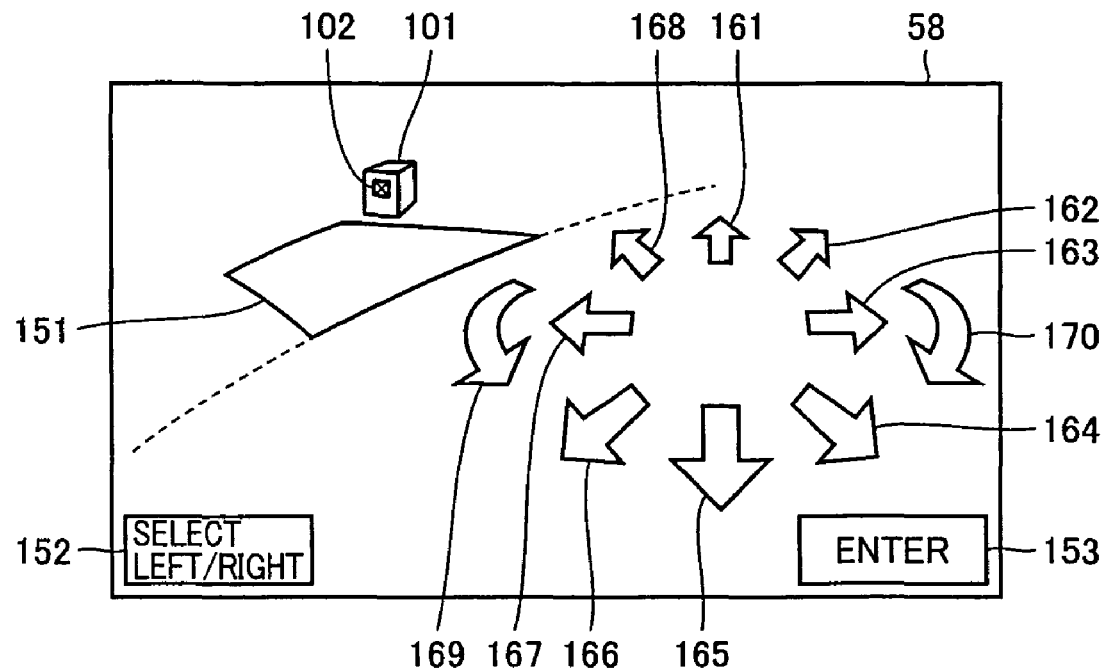
FIG. 8 illustrates screen contents of a touch display displayed in step S2.

FIG. 8 illustrates screen contents of the touch display displayed in step S2.

Referring to FIG. 8, touch display 58 displays a surrounding situation behind the vehicle of which image is taken by back monitor camera 53, and also displays a target parking space frame 151 corresponding to sizes of the vehicle, arrow buttons 161-170 for changing the position of target parking space frame 151, a left/right select button 152 for selecting the right and left of the position of the target parking space frame, and an enter button 153 for designating final determination of the target parking space frame.

Referring to FIG. 8, touch display 58 displays a charger 101 arranged near the parking space. An identifier 102 is attached charger 101 for identifying a charge port. This identifier is not specifically restricted provided that it can be identified by back monitor camera 53, and a distinctive color such as yellow, a two-dimensional bar code or the like may be employed.

A driver can move the position of target parking space frame 151 parallel to itself by arrow buttons 161-168. A driver can change the angle of target parking space frame 151 by arrow buttons 169 and 170.

Referring to FIG. 7 again, after touch display 58 displays the screen contents in step S2, control device 60 determines a specific button operation performed by the driver in step S3.

When it is determined in step S3 that the arrow button is operated, the process proceeds to step S4, and the position of the target parking space frame is changed corresponding to the operation of the arrow button, and then the target parking space frame is displayed in step S2 again.

When the enter button is depressed in step S3, control device 60 determines whether a charger bearing identifier 102 is present in a predetermined region near target parking space frame 151 or not.

When the identifier of the charger is not detected in step S5, the process proceeds to step S14. When identifier 102 of the charger is detected in step S5, the process proceeds to step S6.

In step S6, it is determined whether the SOC of battery B1 in FIG. 1 is smaller than a predetermined threshold Sth(F) or not. Threshold Sth(F) is a threshold for indicating the fully charged state. When the present charge state exceeds this fully charged state, the charging is not required so that the process proceeds to step S14.

When SOC is smaller than Sth(F) in step S6, the process proceeds to step S7. In step S7, control device 60 inquires of the driver about whether the charge is to be performed or not, through display on the touch display, a voice from a speaker (not shown) or the like.

When the driver designates not to perform the charging in step S7, the process proceeds to step S14.

When it is determined in step S5 that the charger is not present, when it is determined in step S6 that the SOC is equal to or higher than threshold Sth(F) and the charging is not required, or when the driver determines in step S7 not to perform the charging, the process proceeds to step S14, and ordinary parking assist will be performed thereafter.

In step S14, control device 60 inquires of the driver, for confirmation, about whether the driver allows movement of the vehicle toward the position of the target parking space frame designated by the driver or not. When the driver allows the start of such movement, the process proceeds to step S15, and automatic steering drive is performed. In this operation, the driver views the surrounding situation for safety and operates the brake pedal for speed control. Thereby, the driver can move the vehicle to the target parking space frame without operating the steering wheel.

When the vehicle arrives at the target parking space frame in step S16, control device 60 stops the vehicle, and ends the parking assist processing.

When the parking assist instruction is not entered in step S1, or when the driver does not allow the start of the vehicle movement toward the designated target parking space frame in step S9 or step S14, the process proceeds to step S17, in which the vehicle is set to the manual operation mode for not performing the automatic steering, and the process ends.

When the driver designates the charging in step S7, the process proceeds to step S8. The selection of charging and not-charging may be performed through buttons displayed on touch display 58, or may be performed, e.g., through a voice or the like processed by voice recognition processing.

In step S8, the processing is performed to adjust minutely the position of target parking space frame 151 that is displayed on touch display 58 and was once fixed. This minute adjustment of the position is performed to achieve a positional relationship with respect to charger 101 so that the charging can be performed easily after parking of the vehicle. For facilitating this minute adjustment, a plurality of identifiers 102 may be arranged near charger 101.

When the processing in step S8 ends, control device 60 inquires of the driver in step S9 about whether the vehicle can be started toward the changed position of the target parking space frame or not. For example, an obstacle such as a bicycle may be present inside the parking space frame so that the above inquiry is performed for avoiding contact with such an obstacle.

When the driver allows the start in step S9, control device 60 calculates the path to the target parking space frame in step S10, and operates EPS actuator 54 to perform the automatic steering driving along the calculated path. In this operation, the driver views the surrounding situation for safety and operates the brake pedal for speed control. Thereby, the driver can move the vehicle to the appropriate position without operating the steering wheel.

When the vehicle position reaches the target parking space frame, the vehicle stops in step S11, and the arm is connected in step S12.

Figure 9:
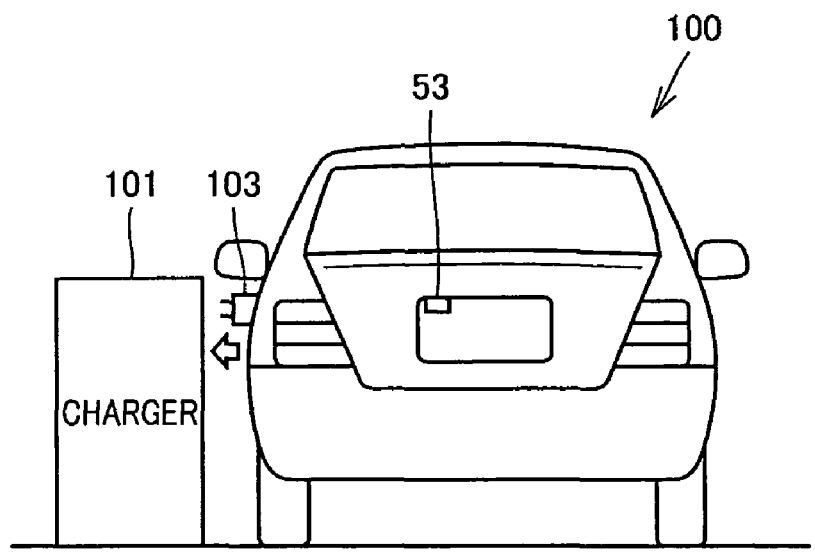
FIG. 9 illustrates arm connection performed in step S12.

FIG. 9 illustrates the arm connection performed in step S12.

Referring to FIG. 9, charger 101 is provided with a receptacle for a charging plug. The automatic steering can achieve the same relationship between charger 101 and vehicle 100 every time. Therefore, the distance between charger 101 and vehicle 100 can be considerably small.

A connection arm 103 may be configured to extend from charger 101. Alternatively, it may be configured to extend from vehicle 100, whereby charger 101 is merely required to have a receptacle supplied with the ordinary commercial power. Further, connection arm 103 can be small in size owing to reduction in distance between charger 101 and vehicle 100.

After the arm connection is performed in step S12, the process proceeds to step S13, and the charge control is performed. When the charging is completed, the process ends.

Figure 10:
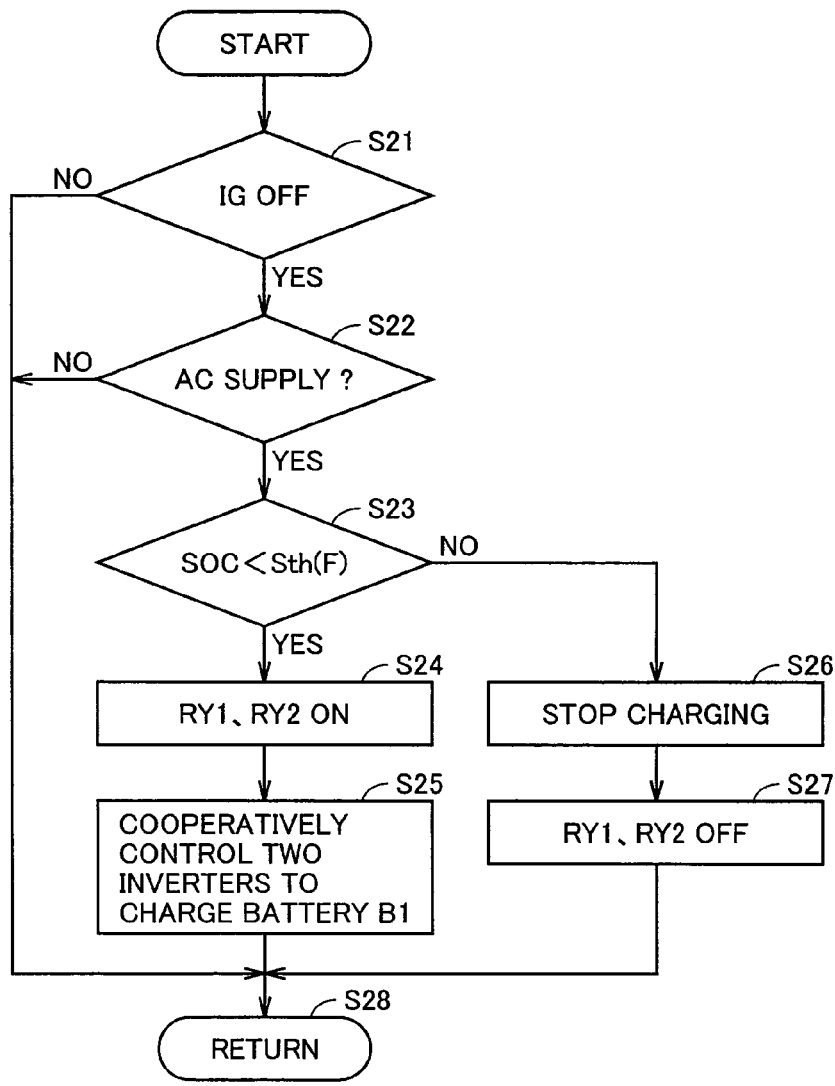
FIG. 10 illustrates charge control in step S13 in FIG. 7.

FIG. 10 illustrates the charge control in step S13 shown in FIG. 7.

Referring to FIGS. 1 and 10, control device 60 first determines in step S21 whether signal IG is off or not. When signal IG is not off in step S21, it is not appropriate to connect a charge cable to the vehicle for charging. Therefore, the process proceeds to step S28 to perform the control according to the flowchart in FIG. 7, and the process ends.

When signal IG is off in step S21, it is determined that the charging can be appropriately performed, and the process proceeds to step S22. In step S22, relays RY1 and RY2 are controlled to change from the off state to the on state, and voltage sensor 74 measures voltage VAC. When the AC voltage is not detected, it can be considered that the charge cable is not connected to the receptacle of connector 50 so that the process proceeds to step S28 without performing the charge processing, and the control is then performed according to the flowchart of FIG. 7 to end the processing.

When an AC voltage is detected as voltage VAC in step S22, the process proceeds to step S23. In step S23, it is determined whether the SOC of battery B1 is smaller than threshold Sth(F) representing the fully charged state or not.

When a relationship of (SOC<Sth(F)) is satisfied in step S23, the charging is allowed so that the process proceeds to step S24. In step S24, the control device turns on both relays RY1 and RY2. In subsequent step S25, control device 60 performs the cooperative control on the two inverters to charge battery B1.

When the relationship of (SOC<Sth(F)) is not satisfied in step S23, battery B1 is already fully charged and does not require the charging so that the process proceeds to step S26. In step S26, the charge stop processing is performed to stop inverters 20 and 30. In subsequent step S27, relays RY1 and RY2 are turned off to interrupt the AC power to vehicle 100. In step S28, the control returns to the flowchart of FIG. 7, and the process ends.

In the first embodiment, the relative positions of the charger on the ground and the charge port of the vehicle can be accurately aligned to attain a predetermined relationship owing to the use of the parking assist device so that the connection can be easily automated. This allows easy charging.

Second Embodiment

The first embodiment has been described in connection with the example in which the parking assist device and the charge control device are arranged on only the vehicle side, and are not arranged inside the charger. A second embodiment will be described below in connection with an example in which a control device of the charger and a control device on the vehicle side cooperate to assist the parking and to control the charging.

Figure 11:
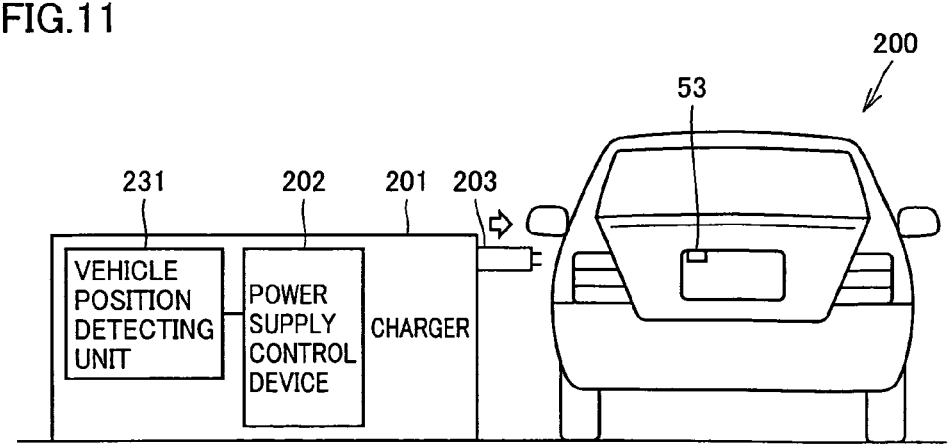
FIG. 11 illustrates connection of a connection arm in a second embodiment.

FIG. 11 illustrates connection of a connection arm in the second embodiment.

In FIG. 11, a connection arm 203 can extend from a charger 201 to a vehicle 200 in contrast to the structure in FIG. 9. Charger 201 is internally provided with a power supply control device 202 controlling the apparatus on the ground side in FIG. 11 and a vehicle position detecting unit 231 corresponding to, e.g., a magnetic sensor.

Figure 12:
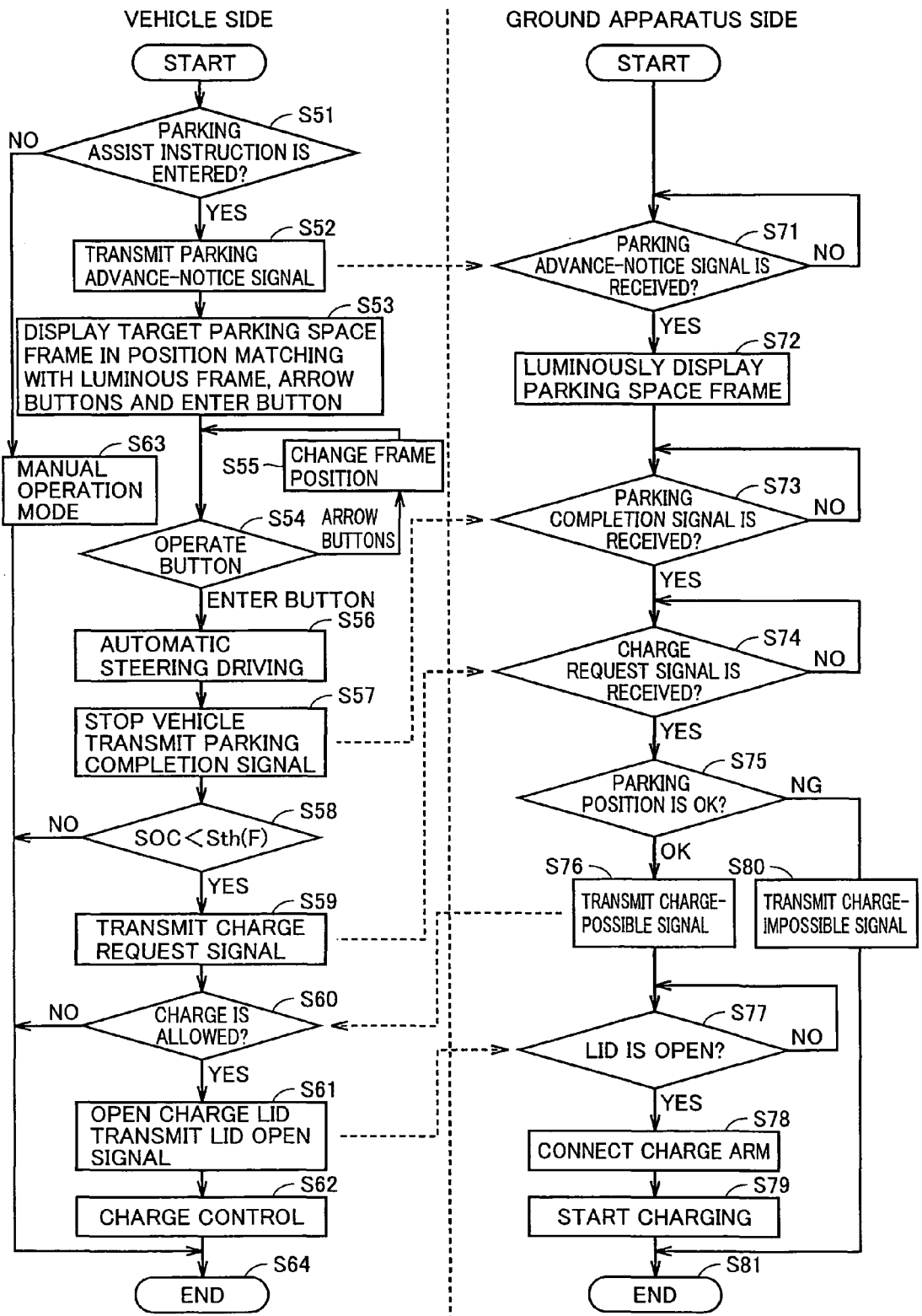
FIG. 12 is a flowchart illustrating a control structure of a program executed on a vehicle-side and an apparatus-side in the second embodiment.

FIG. 12 is a flowchart illustrating a control structure of a program executed on the vehicle-side and the apparatus-side in the second embodiment.

Referring to FIG. 12, when processing starts on or in both the vehicle 200 and the ground apparatus (i.e., charger 201), control device 60 on the vehicle side determines in step S51 whether a driver has entered a parking assist instruction or not. It is determined that the parking assist instruction is entered, e.g., when parking assist switch 52 is on and the shift lever is in the reverse position.

When the parking assist instruction is not entered, a manual operation mode is set in step S63, and a driver operates the steering wheel to control the vehicle without performing the automatic steering.

When it is determined in step S51 that the parking assist instruction is entered, the process proceeds to step S52. In step S52, control device 60 on the vehicle side transmits a parking advance-notice signal to the control device on the ground apparatus side. The transmission of the parking advance-notice signal is performed, e.g., by wireless communications. Such a configuration may be employed that the communications from the vehicle to the ground apparatus start when back monitor camera 53 recognizes based on the identifier that the parking space is provided with charger 201.

When the control device on the ground apparatus side receives the parking advance-notice signal when it is in the state for waiting for reception of the parking advance-notice signal in step S71, the process proceeds to step S72.

In step S72, the control device on the ground apparatus side performs luminous display of the parking space frame.

Figure 13:
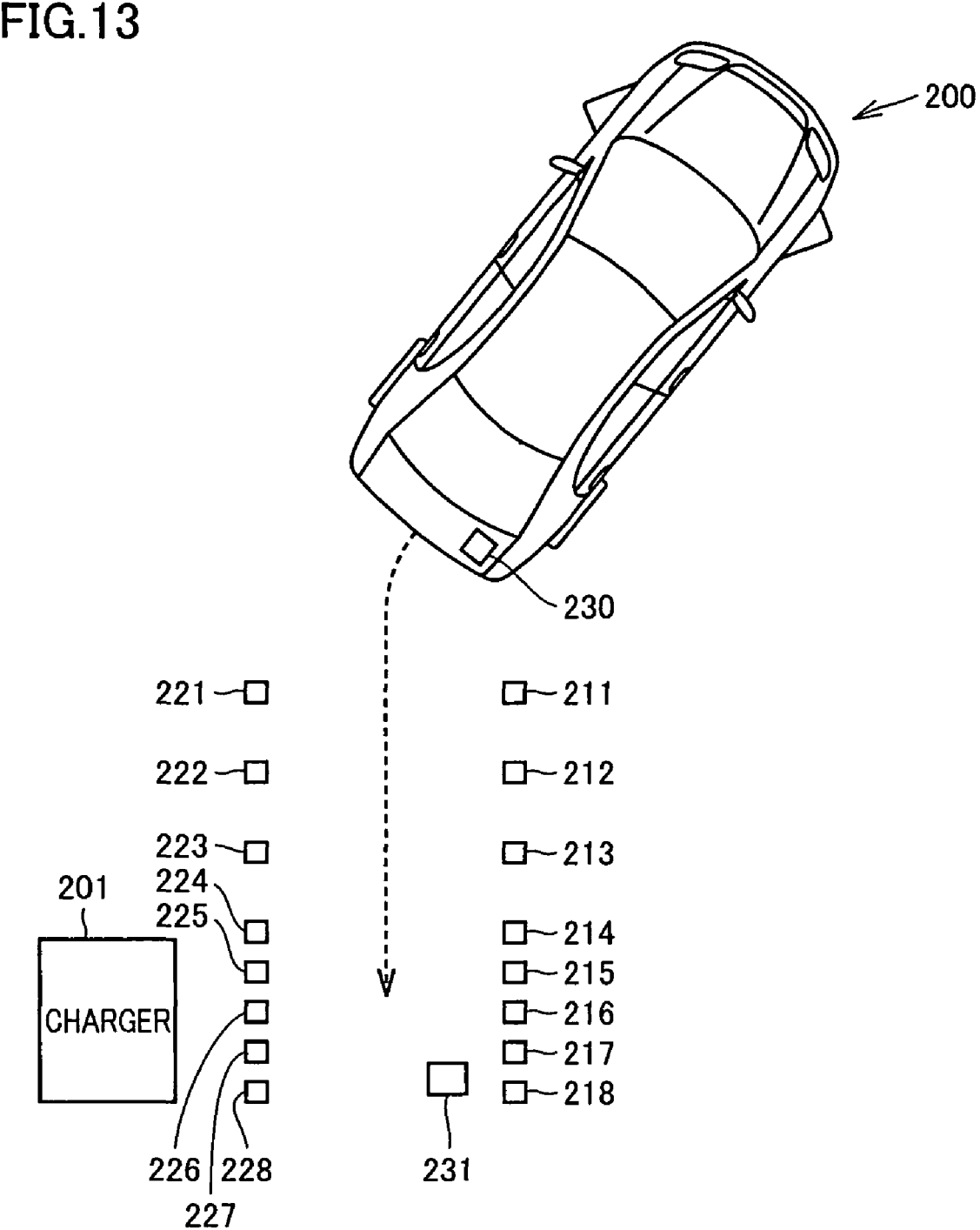
FIG. 13 illustrates luminous display of a parking space frame.

FIG. 13 illustrates the luminous display of the parking space frame.

Referring to FIG. 13, light-emitting diodes 211-218 and 221-228 or the like are embedded in the predetermined parking space near charger 201 and are exposed on the ground surface. The control device in charger 201 turns on or blinks LEDs 211-218 and 221-228 so that back monitor camera 53 of vehicle 200 can easily recognize the parking space frame position.

Control device 60 on the vehicle side extracts a luminous frame from an image taken by back monitor camera 53, displays the target parking space frame in the position matching with the luminous frame and also displays arrow buttons 161-170 and enter button 153 shown in FIG. 8 beside it.

It is not essential to recognize the parking space frame position itself, and the vehicle may be configured to recognize the position of the charger and thereby to obtain internally the position of the target parking space frame with respect to the recognized position of the charger. Although the LEDs have been described by way of example, other elements emitting infrared rays may be used, in which case back monitor camera 53 is configured to recognize the infrared rays.

When the processing in step S53 ends, control device 60 recognizes the button operation in step S54. When any one of arrow buttons 161-170 is operated in step S54, the process proceeds to step S55, and the position of the target parking space frame is changed to the position determined by operating the arrow buttons(s). Then, the process returns to step S54.

When the enter button is depressed in step S54, the process proceeds to step S56. In step S56, the automatic steering drive is performed similarly to the first embodiment. Thus, the driver views the surrounding situation and operates the brake pedal. Thereby, the driver adjusts the vehicle speed and moves the vehicle to the target parking space frame.

When the vehicle has moved to the target parking space frame, the vehicle stops and control device 60 transmits a parking completion signal to the control device on the ground-side apparatus in step S57. The ground-side apparatus is in the waiting state for determining whether the park completion signal is received or not, in step S73. When the park completion signal is received, the process proceeds from step S73 to step S74. Then, the ground apparatus side enters the waiting state for determining whether the charge request signal is received or not.

When the processing in step S57 ends on the vehicle side, a comparison in magnitude or value is made between the SOC and predetermined threshold Sth(F) in step S58. When the SOC is smaller than threshold Sth(F), the process proceeds to step S59. Otherwise, the process ends. In step S59, a charge request signal is transmitted from the vehicle side to the ground apparatus side. Then, the process proceeds to step S60.

When the ground apparatus side receives the charge request signal in step S74, the process proceeds to step S75, in which it is determined whether the current parking position of the vehicle is appropriate for the charging or not.

This determination can be performed using, e.g., a magnetic sensor that is vehicle position detecting unit 231 embedded in the parking space frame in FIG. 13 and a magnet 230 arranged in the corresponding position on the vehicle side. If the parking assist device operates correctly and the driver has not moved the parking space frame, magnet 230 is located immediately above vehicle position detecting unit 231 when the parking is completed, and vehicle position detecting unit 231 detects the magnetism of magnet 230.

For example, when an obstacle such as a bicycle is located in the predetermined parking position, the target parking space is moved in steps S54 and S55. When the driver parks the vehicle in the moved parking space, vehicle position detecting unit 231 cannot detect the magnetism.

As described above, when vehicle position detecting unit 231 detects the magnetism, it is determined that the vehicle is in the appropriate position. When the vehicle position detecting unit 231 does not detect the magnetism, it is determined that the vehicle is in the inappropriate position. When the vehicle is in the appropriate position in step S75 (OK in step S75), a charge-possible signal is transmitted from the ground apparatus side to the vehicle side in step S76. When the vehicle is in the inappropriate position in step S75 (NG in step S75), a charge-impossible signal is transmitted from the ground apparatus side to the vehicle side in step S80.

In step S60, it is determined on the vehicle side which one of the charge-possible signal or the charge-impossible signal is received. When the charge-possible signal is determined in step S60, the processing proceeds to step S61. When the charge-impossible signal is determined, the process ends in step S64.

In step S61, the vehicle-side control device opens a charge lid, and transmits a lid-open signal to the ground apparatus side. In step S77 subsequent to step S76, the ground apparatus side determines according to reception or nonreception of this lid-open signal whether the charge lid is open or not.

When the lid-open signal is detected, the processing proceeds from step S77 to step S78, in which connection arm 203 in FIG. 11 is connected. In contrast to the case in FIG. 9, connection arm 203 in FIG. 13 extends from charger 201 to vehicle 200.

When the connection arm is connected in step S78, charger 201 supplies the power in step S79. In parallel with this, it is detected on the vehicle side that the power is supplied by performing the charge control in step S62 as illustrated in FIG. 10, and the charging is executed by the cooperative control of inverters 20 and 30.

When the processing in steps S62 and S79 ends, the charge processing and power supply processing end in steps S64 and S81, respectively.

In the second embodiment, since the connection arm is arranged on the ground apparatus side, the vehicle structure can be simple, and the weight and cost of the vehicle can be reduced.

The invention is not restricted to the charging of the vehicle, and can also be applied to the case where the vehicle supplies the electric power to the apparatus.

The connection between the vehicle and the charger is not restricted to the contact connection using the cable having, e.g., the plug, and may be performed by a non-contact connection transmitting and receiving an electric power via coils and the like.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A vehicle parking assist system of a vehicle having a vehicle-side power transmission/reception unit by which a storage device of the vehicle can be electrically charged, the vehicle parking assist system comprising:
    a sensing system configured to determine whether an apparatus-side power transmission/reception unit is provided for a parking space; and
    a vehicle control system configured to guide the vehicle into the parking space so that, when the apparatus-side power transmission/reception unit is determined to be provided for the parking space, the vehicle-side power transmission/reception unit of the vehicle has a predetermined positional relationship with respect to the apparatus-side power transmission/reception unit provided for the parking space when parking assist is completed.

2. The vehicle parking assist system of claim 1, further comprising:
    an imaging unit mounted on the vehicle and obtaining an image of the parking space, wherein:
    the sensing system determines whether the apparatus-side power transmission/reception unit is provided for the parking space by analyzing the image of the parking space obtained by the imaging unit.

3. The vehicle parking assist system of claim 2, wherein:
    the sensing system determines that the apparatus-side power transmission/reception unit is provided for the parking space when the sensing system locates indicia indicative of the apparatus-side power transmission/reception unit in the image of the parking space obtained by the imaging unit.

4. The vehicle parking assist system of claim 1, wherein:
    the vehicle control system controls at least one of steering and braking of the vehicle to guide the vehicle into the parking space.

5. The vehicle parking assist system of claim 4, wherein:
    the vehicle control system controls both the steering and the braking of the vehicle to guide the vehicle into the parking space.

6. The vehicle parking assist system of claim 1, wherein:
    the vehicle control system controls braking of the vehicle to stop the vehicle in the parking space so that when stopped, the vehicle-side power transmission/reception unit of the vehicle has the predetermined positional relationship with respect to the apparatus-side power transmission/reception unit provided for the parking space.

7. The vehicle parking assist system of claim 6, wherein the predetermined positional relationship is such that the vehicle-side power transmission/reception unit can receive power from the apparatus-side power transmission/reception unit.

8. The vehicle parking assist system of claim 1, further comprising:
    an imaging unit mounted on the vehicle;
    a display mounted within the vehicle at a position so that a screen of the display can be viewed by an operator of the vehicle; and
    an input unit by which the operator can designate the parking space for which parking assist is desired, the parking space being displayed on the screen of the display as a part of a scene obtained by the imaging unit,
    wherein the sensing system determines whether the apparatus-side power transmission/reception unit is provided for the parking space that has been designated by the input unit by analyzing the image of the scene displayed on the screen of the display.

9. The vehicle parking assist system of claim 8, wherein the input unit is a touch screen included in the display.

10. The vehicle parking assist system of claim 8, wherein the imaging unit is configured to obtain the image of the scene, at least a part of which is located behind the vehicle.

11. The vehicle parking assist system of claim 1, wherein the predetermined positional relationship is such that the vehicle-side power transmission/reception unit can receive power from the apparatus-side power transmission/reception unit.

12. The vehicle parking assist system of claim 1, wherein the vehicle-side power transmission/reception unit is a non-contact connection power transmission/reception unit.

13. The vehicle parking assist system of claim 1, wherein the vehicle-side power transmission/reception unit is a contact connection power transmission/reception unit.

14. A vehicle parking assist method of providing assistance in guiding a vehicle into a parking space, the vehicle having a vehicle-side power transmission/reception unit by which a storage device of the vehicle can be electrically charged, the method comprising:
    determining, with a sensing system of the vehicle, whether an apparatus-side power transmission/reception unit is provided for a parking space; and
    when the apparatus-side power transmission/reception unit is determined to be provided for the parking space, guiding the vehicle, with a vehicle control system of the vehicle, into the parking space so that when parking assist is completed, the vehicle-side power transmission/reception unit of the vehicle has a predetermined positional relationship with respect to the apparatus-side power transmission/reception unit provided for the parking space.

15. The method of claim 14, further comprising:
    obtaining an image of the parking space with an imaging unit mounted on the vehicle, wherein:
    the determining includes the sensing system analyzing the image of the parking space obtained by the imaging unit to determine whether the apparatus-side power transmission/reception unit is provided for the parking space.

16. The method of claim 15, wherein:
    the determining determines that the apparatus-side power transmission/reception unit is provided for the parking space when the sensing system locates indicia indicative of the apparatus-side power transmission/reception unit in the image of the parking space obtained by the imaging unit.

17. The method of claim 14, wherein:
    the guiding includes controlling at least one of steering and braking of the vehicle with the vehicle control system to guide the vehicle into the parking space.

18. The method of claim 17, wherein:
    the guiding includes controlling both the steering and the braking of the vehicle to guide the vehicle into the parking space.

19. The method of claim 14, wherein:
    the guiding includes controlling braking of the vehicle with the vehicle control system to stop the vehicle in the parking space so that when stopped, the vehicle-side power transmission/reception unit of the vehicle has the predetermined positional relationship with respect to the apparatus-side power transmission/reception unit provided for the parking space.

20. The method of claim 19, wherein the predetermined positional relationship is such that the vehicle-side power transmission/reception unit can receive power from the apparatus-side power transmission/reception unit.

21. The method of claim 14, further comprising:
obtaining an image of a scene with an imaging unit mounted on the vehicle;
displaying the image of the scene obtained by the imaging unit on a display mounted within the vehicle at a position so that a screen of the display can be viewed by an operator of the vehicle; and
receiving an operator designation of the parking space for which parking assist is desired via an input unit of the vehicle, the parking space being displayed on the screen of the display as a part of the scene obtained by the imaging unit,
wherein the determining includes determining whether the apparatus-side power transmission/reception unit is provided for the parking space that has been designated by the input unit by analyzing the image of the scene displayed on the screen of the display.

22. The method of claim 21, wherein the input unit is a touch screen included in the display.

23. The method of claim 21, wherein at least a part of the scene is located behind the vehicle.

24. The method of claim 14, wherein the predetermined positional relationship is such that the vehicle-side power transmission/reception unit can receive power from the apparatus-side power transmission/reception unit.

25. The method of claim 14, wherein the vehicle-side power transmission/reception unit is a non-contact connection power transmission/reception unit.

26. The method of claim 14, wherein the vehicle-side power transmission/reception unit is a contact connection power transmission/reception unit.

* * * * *

UNITED STATES PATENT AND TRADEMARK OFFICE
CERTIFICATE OF CORRECTION

PATENT NO.       : 8,169,340 B2
APPLICATION NO.  : 11/992386
DATED            : May 1, 2012
INVENTOR(S)      : Hichirosai Oyobe et al.

It is certified that error appears in the above-identified patent and that said Letters Patent is hereby corrected as shown below:

On the Title Page and Col. 1, lines 1-5, the title should be amended to read:

-- PARKING ASSIST DEVICE AND A METHOD FOR ELECTRIC POWER TRANSMISSION AND RECEPTION BETWEEN A VEHICLE AND A GROUND APPARATUS --

Signed and Sealed this
Fourteenth Day of August, 2012

David J. Kappos
*Director of the United States Patent and Trademark Office*